US012157230B2

(12) United States Patent
Wong et al.

(10) Patent No.: US 12,157,230 B2
(45) Date of Patent: Dec. 3, 2024

(54) INTELLIGENT CLEAR PATH

(71) Applicant: Fanuc America Corporation, Rochester Hills, MI (US)

(72) Inventors: Ho Cheung Wong, Troy, MI (US); Brad Borek, Grosse Pointe Woods, MI (US)

(73) Assignee: FANUC AMERICA CORPORATION, Rochester Hills, MI (US)

( * ) Notice: Subject to any disclaimer, the term of this patent is extended or adjusted under 35 U.S.C. 154(b) by 387 days.

(21) Appl. No.: 17/493,087

(22) Filed: Oct. 4, 2021

(65) Prior Publication Data

US 2023/0109223 A1    Apr. 6, 2023

(51) Int. Cl.
*B25J 9/16*     (2006.01)
*G06N 3/006*     (2023.01)
(Continued)

(52) U.S. Cl.
CPC ........... *B25J 9/1671* (2013.01); *B25J 9/1666* (2013.01); *G06N 5/01* (2023.01)

(58) Field of Classification Search
None
See application file for complete search history.

(56) References Cited

U.S. PATENT DOCUMENTS 5,544,282 A     8/1996   Chen et al.
7,774,099 B2     8/2010   Kobayashi et al.
(Continued)

FOREIGN PATENT DOCUMENTS

CN     103433925 B     5/2018
CN     112372631 A     2/2021
(Continued)

OTHER PUBLICATIONS

Nasir, Jauwairia; Malik, Usman; Islam, Fahad; Hasan, Osman; "RRT*—Smart: A rapid convergence implementation of RRT*", Jan. 2013International Journal of Advanced Robotic Systems. (Year: 2013).*

(Continued)

*Primary Examiner* — Jaime Figueroa
*Assistant Examiner* — Atticus A Cameron
(74) *Attorney, Agent, or Firm* — John A. Miller; Shumaker, Loop & Kendrick, LLP

(57) ABSTRACT

A technique for automatically finding a collision-free return-to-home path for a robot. The technique includes running a simulated virtual 3D environment which emulates the physical robot and workcell in real time, including the positions and poses of all robots, workpieces and obstacles in the workcell. Upon request by an operator, a return-to-home path search is executed based on the virtual 3D environment, where the path search calculates a solution which moves the robot from a current position to its home or recovery position while avoiding collisions with other robots, workpieces or objects in the workcell. In addition to collision avoidance, the path search considers other constraints such as prohibited zones in the workspace and robot joint positions. When the recovery path is computed, the solution program is sent back to the physical environment for execution by the physical robot.

20 Claims, 7 Drawing Sheets

(51) Int. Cl.
    *G06N 3/008*    (2023.01)
    *G06N 5/01*     (2023.01)

(56) References Cited

U.S. PATENT DOCUMENTS

| | | | |
|---|---|---|---|
| 9,102,062 | B2 | 8/2015 | Lee et al. |
| 9,925,664 | B2 | 3/2018 | Takeda |
| 10,124,488 | B2 | 11/2018 | Lee et al. |
| 10,723,024 | B2 | 7/2020 | Konidaris et al. |
| 10,899,006 | B2 | 1/2021 | Holson |
| 11,318,616 | B2* | 5/2022 | Mcgregor ............... B25J 9/1671 |
| 2015/0266182 | A1* | 9/2015 | Strandberg ............. B25J 9/1676 700/255 |
| 2015/0277398 | A1 | 10/2015 | Madvil et al. |
| 2018/0297204 | A1 | 10/2018 | Krasny et al. |
| 2019/0163191 | A1 | 5/2019 | Sorin et al. |
| 2021/0001483 | A1* | 1/2021 | Milenkovic ............ B25J 9/1666 |
| 2021/0252707 | A1* | 8/2021 | Wang ...................... B25J 9/1697 |
| 2022/0032459 | A1* | 2/2022 | Kojima .................. B25J 9/1676 |

FOREIGN PATENT DOCUMENTS

| | | |
|---|---|---|
| JP | 2014073550 A | 4/2014 |
| WO | 2019227307 A1 | 12/2019 |
| WO | 2020199580 A1 | 10/2020 |

OTHER PUBLICATIONS

Realtime Robotics, Realtime Robotics Partners with Siemens to Accelerate the Integration of Industrial Robotic Workcells, Jun. 25, 2020, Boston.

Sorin, Dan, Transforming Industrial Automation with the Rapid Motion Planning, Pt 1, Aug. 26, 2020.

Business Wire, Battelle Proves Collision Avoidance Software in High Stakes Demo with Aerobotix, Aug. 27, 2017, Madison, Ala.

Murray et al., A Programmable Architecture for Robot Motion Planning Acceleration.

Murray et al., Robot Motion Planning on a Chip, Appearing in Robotics: Science and Systems 2016.

* cited by examiner

INTELLIGENT CLEAR PATH

BACKGROUND

Field

The present disclosure relates to the field of industrial robot motion planning and, more particularly, to a technique for automatically finding a collision-free return-to-home path for a robot, including virtually emulating the physical robot and workcell in real time, calculating a return-to-home path program which moves the robot from a current position to its home position while avoiding collisions with any object in the workcell, and executing the solution program by the physical robot.

Discussion of the Related Art

The use of industrial robots to perform a wide range of manufacturing, assembly and material movement operations is well known. In many robot workspace environments, obstacles are present and may be in the path of the robot's motion. The obstacles may be permanent structures such as machines and fixtures, or the obstacles may be temporary or mobile. A large workpiece such as a vehicle body on a conveyor which is being operated on by the robot may itself be an obstacle, as the robot must maneuver in or around the workpiece while performing an operation such as welding or painting. Collisions between the robot and any obstacle must absolutely be avoided.

Due to the complex nature of robotic workspaces—including fixed and moving obstacles, moving workpieces, and often multiple robots with interrelated motion plans—robots occasionally get "stuck" where the executing programs are aborted and they must be moved from a current position back to their home position in order to recover and resume automatic execution on the next part. Executing programs may be aborted for various reasons such as a robot mechanical, electrical or position error as well as process equipment failures. Because each such recovery situation is different, a unique robot motion (path plan) must be calculated which moves the robot from the current position to the home or recovery position while avoiding collisions between any part of the robot and any other robot, workpiece or obstacle in the workspace.

Prior art techniques exist for returning a robot to its recovery position from a position where it is "stuck". One existing technique is for an operator to use a teach pendant to manually "jog" or move the robot to extricate it from the problematic situation and eventually return it to a home or recovery position. However, when the robot is stuck in tight quarters, such as where the robot has reached inside a vehicle body to paint, manually jogging the robot without accidentally causing a collision requires great operator skill, and might be nearly impossible even for an expert operator. Another existing technique is to define recovery path programs in advance which can be used as needed to get a robot home from a stuck position. However, in complex environments with many moving objects, it is very difficult to create recovery path programs which anticipate every possible situation that the robot could find itself in.

In light of the circumstances described above, there is a need for an improved technique for computing a clear recovery path for robots which can be employed as needed and under any circumstances.

SUMMARY

In accordance with the teachings of the present disclosure, a technique for automatically finding a collision-free return-to-home path for a robot is disclosed. The technique includes running a simulated virtual 3D environment which emulates the physical robot and workcell in real time, including the positions and poses of all robots, workpieces and obstacles in the workcell. Upon request by an operator, a return-to-home path search is executed based on the virtual 3D environment, where the path search calculates a solution which moves the robot from a current position to its home or recovery position while avoiding collisions with other robots, workpieces or objects in the workcell. In addition to collision avoidance, the path search considers other constraints such as prohibited zones within the workspace and robot joint positions. When the recovery path is computed, the solution program is sent back to the physical environment for execution by the physical robot.

Additional features of the presently disclosed devices and methods will become apparent from the following description and appended claims, taken in conjunction with the accompanying drawings.

DETAILED DESCRIPTION OF THE EMBODIMENTS

The following discussion of the embodiments of the disclosure directed to a technique for automatically finding a collision-free feasible return-to-home path for a robot is merely exemplary in nature, and is in no way intended to limit the disclosed devices and techniques or their applications or uses.

It is well known to use industrial robots for a variety of manufacturing, assembly and material movement operations. In many robot workspace environments, obstacles are present and may be in the path of the robot's motion—that is, the obstacles may be located between where a robot is currently positioned and the robot's destination position. The obstacles may be permanent structures such as machines and fixtures, or the obstacles may be temporary or mobile. A large workpiece which is being operated on by the robot may itself be an obstacle, as the robot must maneuver in or around the workpiece while performing an operation such as welding or painting. Techniques have been developed in the art for computing robot motions such that the tool follows a path which avoids collision of the robot with any defined obstacles.

Due to the complex nature of some robotic workspaces—including fixed and moving obstacles, fixed and moving workpieces, and often multiple robots with interrelated motion plans—robots occasionally get "stuck" where the executing programs are aborted and they must be moved from a current position back to their home position in order to recover and resume automatic execution on the next part. Because each such recovery situation is different, a unique robot motion (path plan) must be calculated which moves the robot from the current position to the home or recovery position while avoiding collisions between any part of the robot and any other robot, workpiece or obstacle in the workspace.

Figure 1:
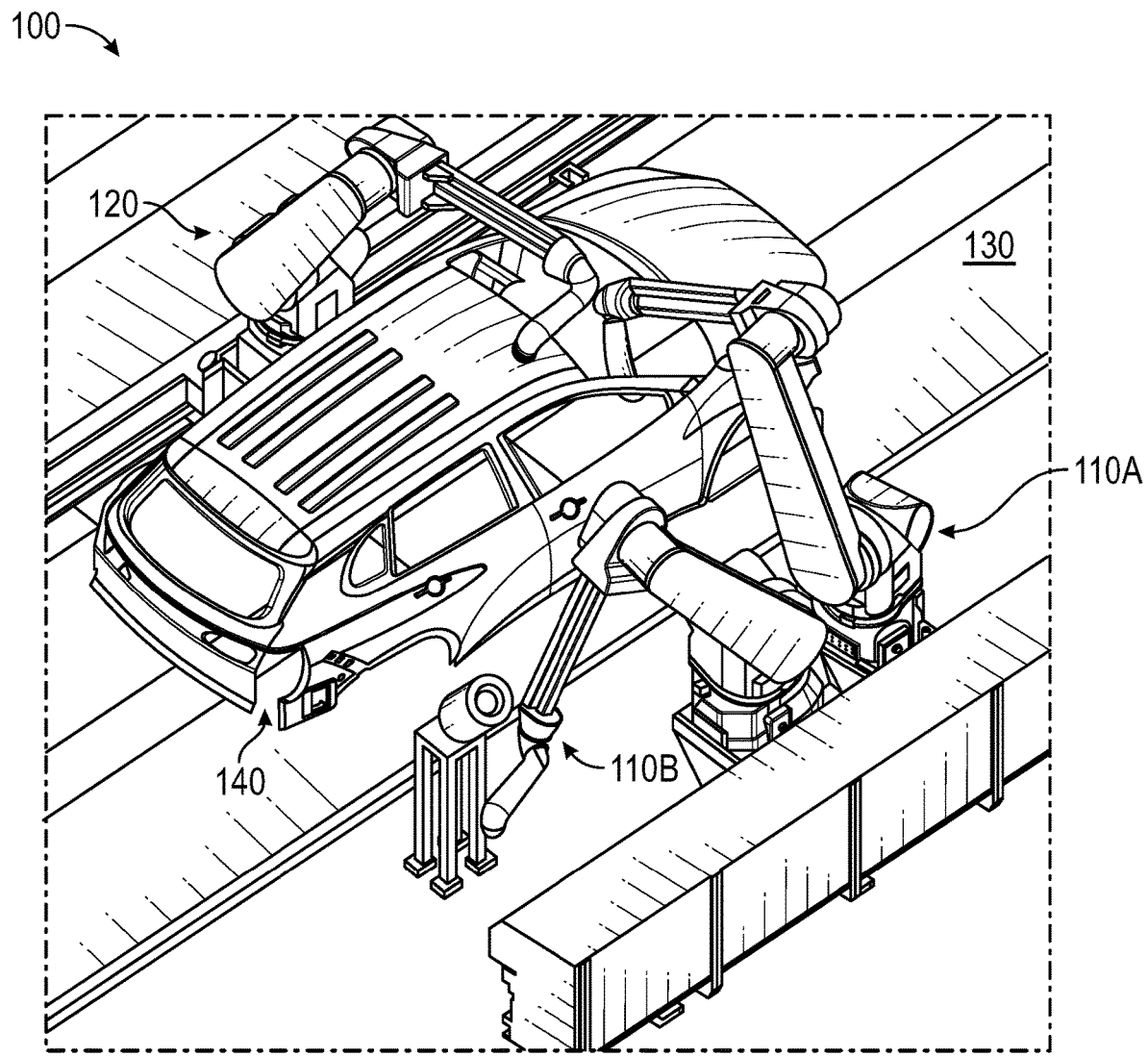
FIG. 1 is an illustration of a painting robot workcell including two painting robots (one of which is shown in two different positions) and a conveyor moving vehicle bodies to be painted, depicting an environment where a clear recovery path program calculation may occasionally be needed.

FIG. 1 is an illustration of a painting robot workcell 100 including two painting robots (110, 120) and a conveyor 130 moving a vehicle body 140 to be painted. The workcell 100 depicts an environment where a clear recovery path program calculation for one or more robots may occasionally be needed. For example, if the conveyor 130 stops while the robot 110 is in a position 110A where it has reached inside a window or door of the vehicle body 140 to paint an interior surface, movement of the robot 110 back to its home or recovery position 110B will need to be performed very carefully to ensure that there is no contact between any part of the robot 110 and any part of the vehicle body 140 or any other object in the workcell 100. FIG. 1 illustrates just one example of an environment where a clear recovery path may need to be computed. Other examples include robots used for machine tending, pick-and-place robots, welding and material dispensing robots, and virtually any robot that operates in a workcell with other robots or fixed or moving obstacles and/or workpieces.

Prior art techniques exist for returning a robot to its recovery position from a position where it is "stuck". One existing technique is for an operator to use a teach pendant to manually "jog" or move the robot to extricate it from the problematic situation and eventually return it to a home or recovery position. However, when the robot is stuck in tight quarters, manually jogging the robot without accidentally causing a collision requires great operator skill, and might be problematic even for an expert operator. Another existing technique is to define recovery path programs in advance which can be used as needed to get a robot home from a stuck position. However, in complex environments with many objects, it is very difficult to create recovery path programs which anticipate every possible situation that the robot could find itself in.

The present disclosure describes a technique for computing a clear recovery path for one or more robots in a workcell which provides advantages over existing techniques. The presently disclosed method and system operate automatically to compute the clear recovery path when needed, and transfer the computed recovery path program to the physical robot(s) for execution. The disclosed technique performs collision avoidance checks based on actual geometries, and evaluates other important criteria when computing recovery path points, thus ensuring that the computed solution is robust and feasible.

Figure 2:
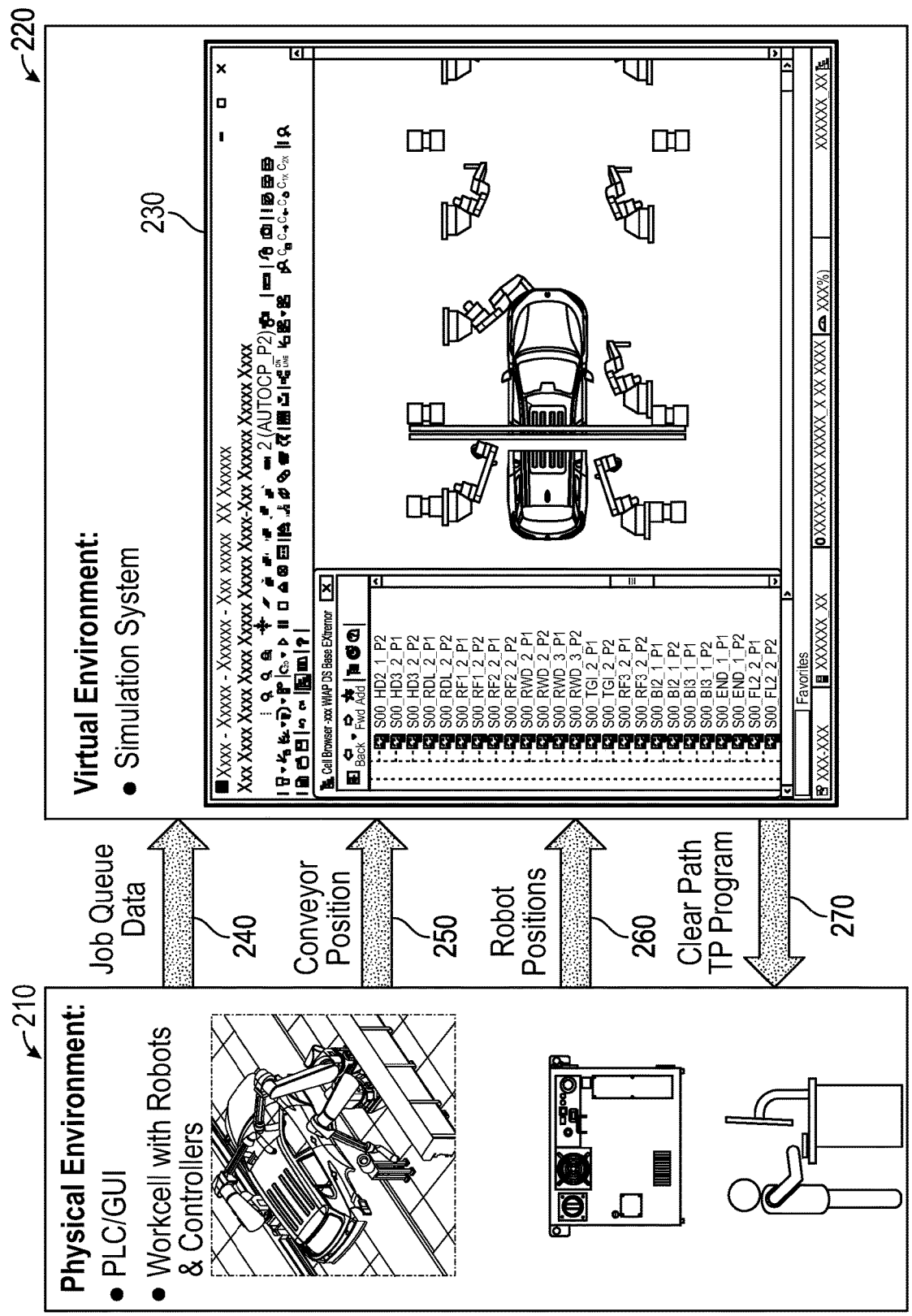
FIG. 2 is a simplified block data flow diagram illustrating how data is received in a virtual simulation environment and used to compute a clear recovery path which is then transferred back to a physical robot for execution, according to an embodiment of the present disclosure.

FIG. 2 is a simplified block data flow diagram 200 illustrating how data is received in a virtual simulation environment and used to compute a clear recovery path which is then transferred back to a physical robot for execution, according to an embodiment of the present disclosure. A physical environment 210 is an actual physical workcell such as the one depicted in FIG. 1—including one or more robot, each with its corresponding controller. In a multi-robot workcell such as the one shown in FIG. 1, each robot is programmed to perform a different task—such as painting a different part of a vehicle body. In such a multi-robot workcell, a master workcell controller runs software which communicates and coordinates actions with all of the individual robot controllers. The master workcell controller may be a programmable logic controller (PLC), for example. An operator has a user interface to software which communicates with the PLC.

A virtual environment 220 includes a simulation system 230 which is software which emulates the physical environment 210 in real time during robot operations. The simulation system 230 receives job queue data from the physical environment 210 as indicated by arrow 240. The job queue data includes information such as the type, sequence and timing of workpieces being processed in the workcell, which data is available from the PLC. The simulation system 230 also receives conveyor position data, if present, from the physical environment 210 as indicated by arrow 250. The conveyor position data is also available from the PLC and, together with the job queue data, enables determination of the identity and location of each workpiece in the workcell. The workpieces are obstacles which the robots must avoid at all times—including during normal operations, and during a return-to-home recovery action. In addition, the simulation system 230 receives robot position data from the physical environment 210 as indicated by arrow 260. The robot position data includes joint positions for all robots in the workcell, which data is available from the robot controllers. Upon operator request, using the techniques of the present disclosure (discussed below), the simulation system 230 computes the clear recovery path and transfers the clear path motion program back to the physical environment 210 as indicated by arrow 270.

The system of FIG. 2 described above is one example of a clear recovery path implementation which has been developed for a multi-robot spray painting line. It is to be understood that many other types of robotic systems—such as laser welders, machine tending systems, etc.—can benefit from the clear recovery path computation techniques of the present disclosure. As long as the clear recovery path computation routine is able to receive data defining the current positions, orientations and shapes of the robot(s) and all obstacles, the clear recovery path can be computed.

Figure 3:
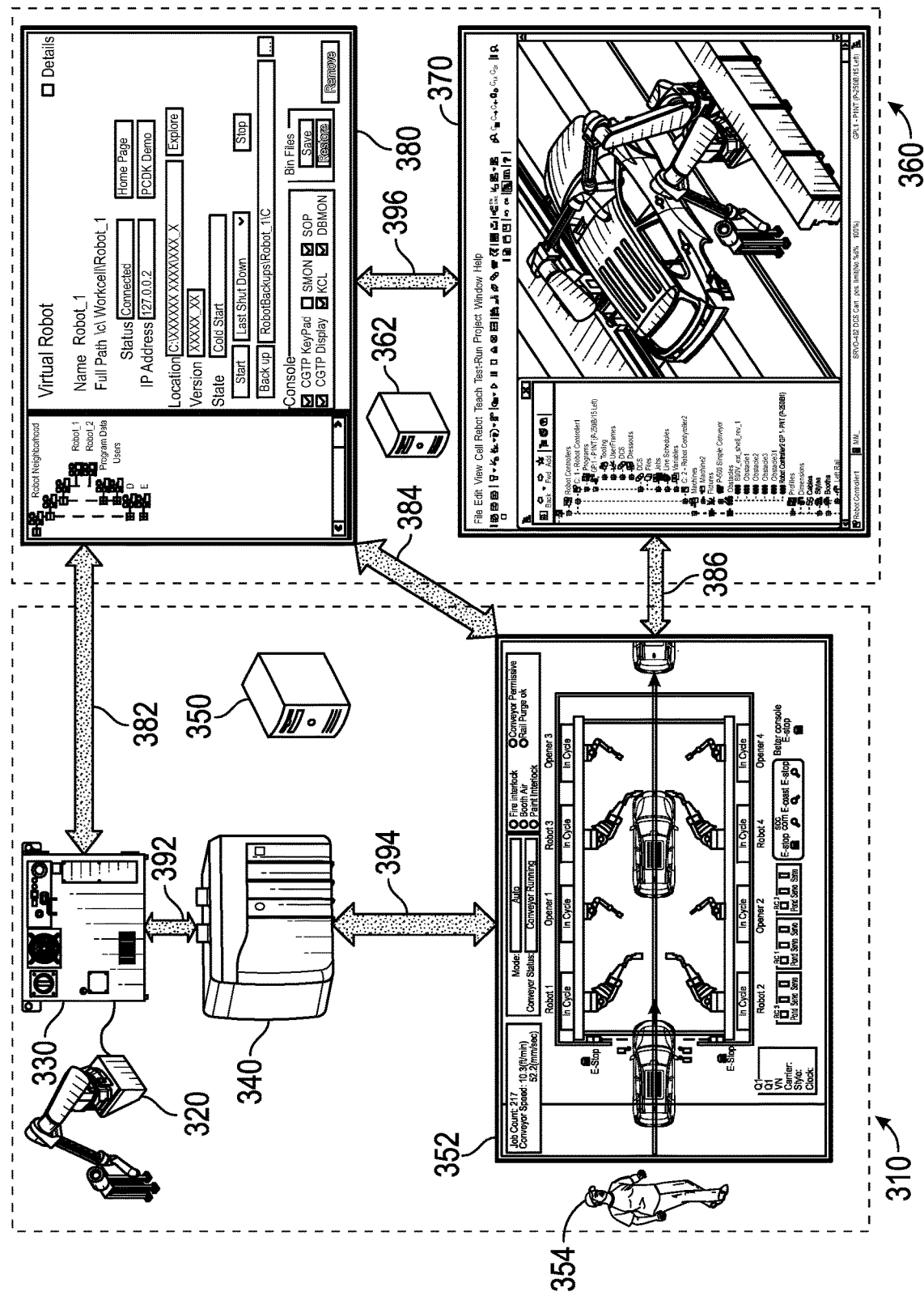
FIG. 3 is a block diagram illustrating the elements of a physical robot workcell and the corresponding virtual simulation environment for computing a clear recovery path when needed, according to an embodiment of the present disclosure.

FIG. 3 is a block diagram illustrating the elements of a physical robot workcell and the corresponding virtual simulation environment for computing a clear recovery path when needed, according to an embodiment of the present disclosure. Where FIG. 2 provided a high level depiction of data flow for the clear recovery path computation technique, FIG. 3 illustrates the individual hardware and software elements in block diagram form.

A physical environment 310 represents a workcell which, continuing with the example described above, is a painting process line with multiple spray painting robots. A virtual environment 360 includes software which mirrors the physical environment 310 and computes the clear recovery path when needed.

The physical environment 310 includes a robot 320 with its corresponding controller 330. In a multi-robot workcell such as the one shown in FIG. 1, there would be additional robots besides the robot 320, and each robot may be programmed to perform a different task—such as painting a different part of a vehicle body. In such a multi-robot workcell, there would also be a master workcell controller 340 running software which communicates and coordinates actions with all of the individual robot controllers. The master workcell controller 340 may be a programmable logic controller (PLC), and will often be referred to as such. The PLC 340 communicates with a computer 350 which runs operator workcell control software 352 including a graphical user interface (GUI) which enables an operator 354 to monitor and control the physical environment 310 via a display device.

The virtual environment 360 includes a simulation system 370 which is software which emulates the physical environment 310 in real time during robot operations. The simulation system 370 corresponds with the simulation system 230 of FIG. 2. A robot server system 380 serves as data collector for all robots in the physical environment 310 and the virtual environment 360. The simulation system 370 and the robot server system 380 may run on the same computer 350 as the operator workcell control software 352, or the simulation system 370 and the robot server system 380 may run on a separate computer 362.

In one embodiment, data interfaces exist between the robot controller 330 (and all robot controllers) and the robot server system 380 (arrow 382) and between the operator workcell control software 352 and the robot server system 380 (arrow 384), as well as directly between the operator workcell control software 352 and the simulation system 370 (arrow 386). In addition, data interfaces exist between the robot controller 330 and the PLC 340, and the PLC 340 and the operator workcell control software 352 (arrows 392 and 394). Another data interface exists between the simulation system 370 and the robot server system 380 (arrow 396).

The systems and interfaces described above depict a real system which has been developed and demonstrated to perform the clear recovery path computation techniques of the present disclosure. However, as would be understood by one skilled in the art, any suitable architecture of systems and interfaces may be used as long as the fundamental requirement is met—which is the ability to deliver data defining the status of the physical environment 310 to the simulation system 370 from wherever the data exists (such as robot position data from the robot controller 330, job queue data from the PLC 340, etc.).

The simulation system 370 knows the model type and base location of every robot in the workcell, and has solid model data representing each arm of each robot, thus enabling computation of robot 3D geometry at all times based on robot joint position data. Robot position data includes the position along a rail for rail-mounted robots as shown in FIG. 1. The simulation system 370 also has solid models defining each type of workpiece which may be processed in the workcell. In addition, the simulation system 370 includes solid models defining the size, shape and location of all fixed obstacles in the workcell. Using all of the data discussed above, the simulation system 370 emulates or mirrors the operation of the physical environment 310 in real time. When the physical environment 310 encounters a problem and the executing program has or must be aborted, the operator 354 may request a clear recovery path to be computed by the simulation system 370. At this point, using the transferred data described above, the simulation system 370 knows the exact location of all workpieces and the exact pose of all robots in the physical environment 310, and also knows the home or recovery position of the robot which needs the clear recovery path. Using the techniques of the present disclosure, the simulation system 370 computes the clear recovery path and transfers the clear path motion program back to the physical environment 310. The operator 354 can then interact with the GUI of the operator workcell control software 352 to instruct the affected robot to return to its home or recovery position using the clear path motion program.

Because the geometry of the robot, the workpiece and the other obstacles may be complex, and because interference checking must be performed between all parts of the robot and all potential obstacles, a closed-form solution for the recovery path is not possible. Instead, a search routine must be used which attempts to find the clear recovery path from the current position of the robot (where the robot is "stuck" or stranded, such as the robot position 110A shown in FIG. 1) to the home or recovery position, using trial and error.

Rapidly-Exploring Random Tree (RRT) is a known algorithm for finding a path through a geometric space while avoiding obstacles. RRT is designed to efficiently search nonconvex, high-dimensional spaces by randomly building a space-filling tree. The tree is constructed incrementally from samples drawn randomly from the search space and is inherently biased to grow towards large unsearched areas of the problem.

Although RRT provides a good framework for the clear recovery path computation, there are several limitations of a basic RRT algorithm in robotic collision avoidance path planning. Many robots include a redundant kinematic axis which improves reachability and allows the robot to satisfy a tool center point motion in more than one joint configuration. Advanced robot motion planning also requires consideration of robot "posture" (e.g., "arm 2 up" vs. "arm 2 down"), and turn number counting for joints which can rotate more than one full turn during robot motion. Robot wrist joint orientation must also be considered. In addition, work envelopes may be quite large, especially when considering all robotic degrees of freedom, and collision avoidance checking of all parts of the robot with respect to all potential obstacles. Each of the factors mentioned above leads to increased calculation time, and/or an inability to return a successful solution.

The present disclosure provides techniques for computing a collision-free clear recovery path for a robot in a complex geometric environment using a specialized RRT algorithm. The clear recovery path computation method of the present disclosure overcomes the limitations described above, and efficiently provides a collision-free, feasible recovery path for the robot whenever possible.

Figure 4:
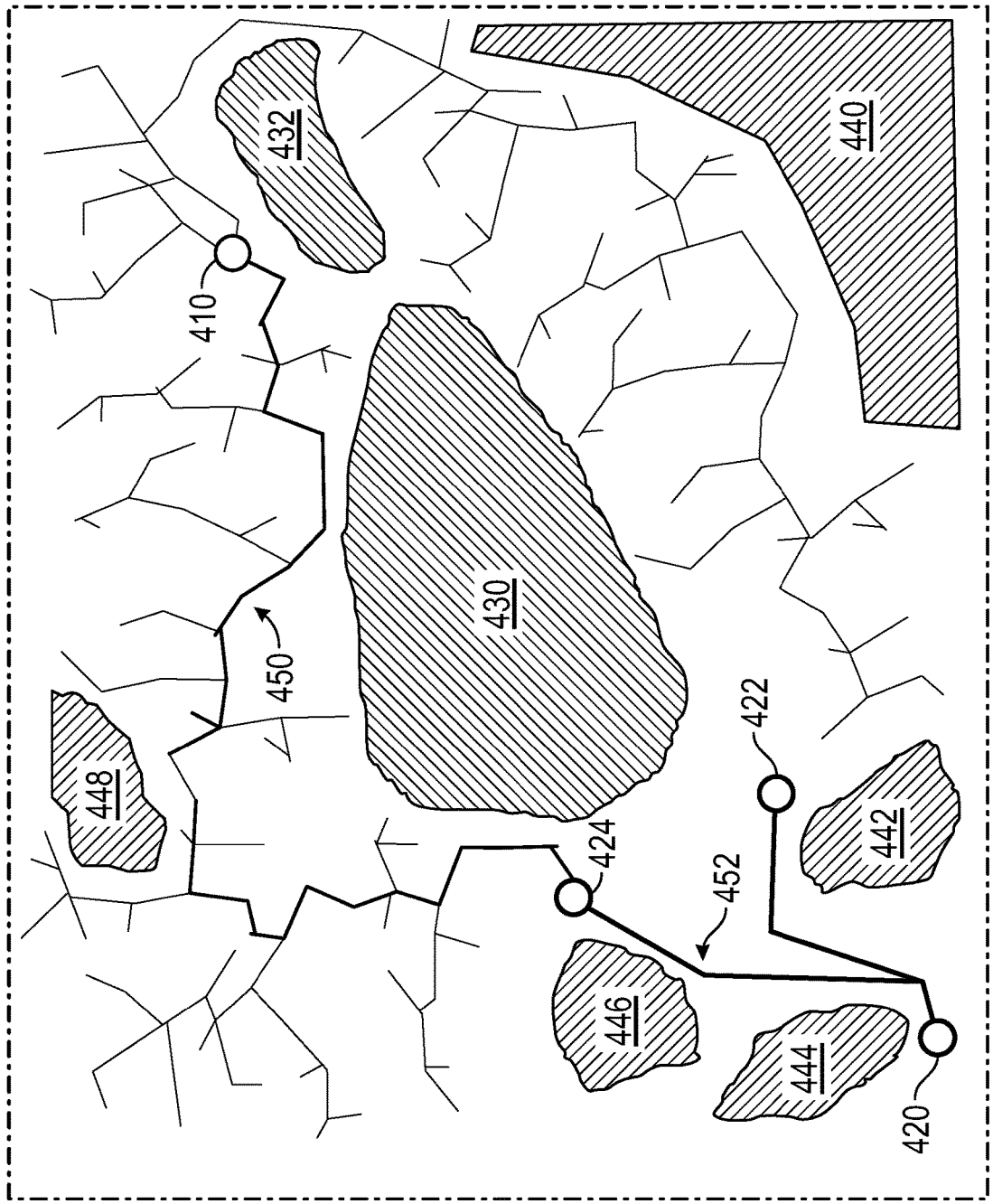
FIG. 4 is a two-dimensional illustration of a Rapidly-Exploring Random Tree (RRT) search algorithm attempting to find a clear recovery path from a current robot position to a home or recovery position, including building a partial home tree, according to an embodiment of the present disclosure.

FIG. 4 is a two-dimensional (2D) illustration of a Rapidly-Exploring Random Tree (RRT) search algorithm attempting to find a clear recovery path from a robot current or start position to a home or recovery position, including building a partial home tree, according to an embodiment of the present disclosure. A start position 410 is the position where the robot faulted or "got stuck". A recovery position 420 is the robot home position or some other safe position where the robot is extricated from the obstacle field. Obstacles 430 and 432 are moving obstacles such as parts of a workpiece moving on a conveyor, or hinged parts (e.g., vehicle doors, hoods) which may be moved to different positions relative to the body of the workpiece. Obstacles 440-448 are fixed obstacles in the robotic workcell—such as walls, robot longitudinal mounting rails, paint applicator cleaning stations, and other structures.

Although FIG. 4 is illustrated in 2D for clarity, it is to be understood that the actual specialized RRT algorithm of the present disclosure computes robot configurations and interference checks in three dimensions (3D) using actual solid model geometry of all robot parts and all obstacles.

When a problem is encountered in the robot workcell and the operator requests computation of a clear recovery path, all of the positional status data for the robot and the workpieces is transferred to the simulation system 370, as discussed above. Thus, the simulation system 370 knows the configuration of the robot and therefore the 3D geometry of all robot arms, knows the position of the workpieces and therefore the 3D geometry of the obstacles 430 and 432, and of course knows the 3D geometry of the fixed obstacles 440-448. All of this 3D geometry is known in a workcell coordinate frame.

The start position 410 in FIG. 4 represents the robot position 110A of FIG. 1. The recovery position 420 in FIG. 4 represents the robot position 110B of FIG. 1. The objective of the clear recovery path computation is to determine a sequence of robot moves which "back the robot out" of the obstacle field and return it to its recovery position—while avoiding any collisions and satisfying all robot configuration constraints along the way.

From the start position 410, the specialized RRT algorithm of the present disclosure creates a random position (node) within the robot work envelope. For the first new proposed node, the start position 410 is the only possible parent node in the tree. The disclosed method then determines whether the robot can move from the parent node to the new proposed node while satisfying all collision avoidance constraints and robot configuration constraints. This determination is made using a move feasibility check technique, discussed below with respect to FIG. 5. If the robot can move successfully from the parent node to the new proposed node, then the new proposed node is added as a child node and a tree branch is created or extended.

The process then returns to creating a new proposed node, and finds the nearest neighbor of the new proposed node—where the nearest neighbor could be the start position 410, or a previously added node in the tree. The nearest neighbor is identified as the parent of the new proposed node. The disclosed method then determines whether the robot can move from the parent node to the new proposed node while satisfying all collision avoidance constraints and robot configuration constraints, using the move feasibility check technique mentioned above.

This process then repeats rapidly from all viable branches of the tree, exploring the configuration space (robot work envelope) to find feasible robot motions. Many of the branches will reach dead ends, where they are blocked by obstacles, or reach the edge of the configuration space, or have looped back inside existing branches. However, some branches will inevitably lead closer to the recovery position 420. While some branches terminate at dead ends, many other branches will continue to be extended.

In a traditional RRT method, the random exploration of the configuration space would continue until a branch reaches the recovery position. However, the technique of the present disclosure adds two steps which enable a solution to be found much more quickly and efficiently, while evaluating all of the collision avoidance and robot kinematics criteria involved in the clear recovery path search.

First, a home tree can be defined in advance by a user, and branches of the home tree may be used during clear recovery path computation to reduce the amount of random searching by the RRT algorithm. In FIG. 4, the home tree includes branches leading from the recovery position 420 to a home tree node 422 and a home tree node 424. The home tree nodes 422 and 424 are robot positions from which the robot can be moved to the home or recovery position 420 through a short sequence of straightforward motions. For example, the home tree node 422 may represent a robot configuration where the paint applicator is located just outside a window of a vehicle body. Similarly for the home tree node 424, which might be located just outside of a vehicle hood opening.

For a particular workcell (physical environment), a user defines home tree motion programs in advance, before a clear recovery path search is needed. Each home tree motion program defines a short sequence of robot motions leading from the recovery position 420 to a helpful position, typically clear of most obstacles, such as the home tree nodes 422 and 424 discussed above. When a clear recovery path search is requested, each home tree motion program is simulated to determine if it is free of collisions and if the posture of the robot after the home tree motion program matches the posture of the robot at the start position 410. If so, then that home tree motion is added as a home tree branch. Several home tree motion programs may be defined for a physical workcell. In FIG. 4, the branches that lead to the home tree nodes 422 and 424 are assumed to have met the criteria mentioned above. Any home tree branches, which meet the criteria and are added to the configuration space, provide more goal or target points for the RRT algorithm to reach as a final destination.

A second technique which is employed in the method of the present disclosure is to occasionally (randomly) try to move directly from a feasible branch node to the recovery position 420, or to one of the home tree nodes 422/424 (if used). This includes checking the feasibility of moving directly from the start position 410 to the recovery position 420, as such a direct move may be possible in some circumstances. Proposed moves directly to the recovery position 420 are evaluated using the move feasibility check technique mentioned above. If a proposed move from a branch node to one of the nodes 420/422/424 is found to be feasible, then the random exploration of the configuration space can be stopped, as a complete feasible recovery path will have been defined from the start position 410 to the recovery position 420. This technique of evaluating a direct move to the recovery position 420 or to one of the home tree nodes 422/424 can be attempted at any suitable regular interval (such as after every fifth branch node) or randomly.

In FIG. 4, the complete recovery path (bold lines) consists of a start tree branch 450 (constructed by organic RRT growth from the start position 410 to the home tree node 424) and a home tree branch 452 (user defined from the recovery position 420 to the home tree node 424). As mentioned earlier, the complete recovery path motion program is then transferred back to the physical environment where the recovery path motion program is used by the robot controller 330 to move the robot 320 back to its recovery position. In some cases, a clear recovery path is needed for more than one robot in the physical environment 310, in which cases the clear recovery path is computed for each robot in the manner described above.

Figure 5:
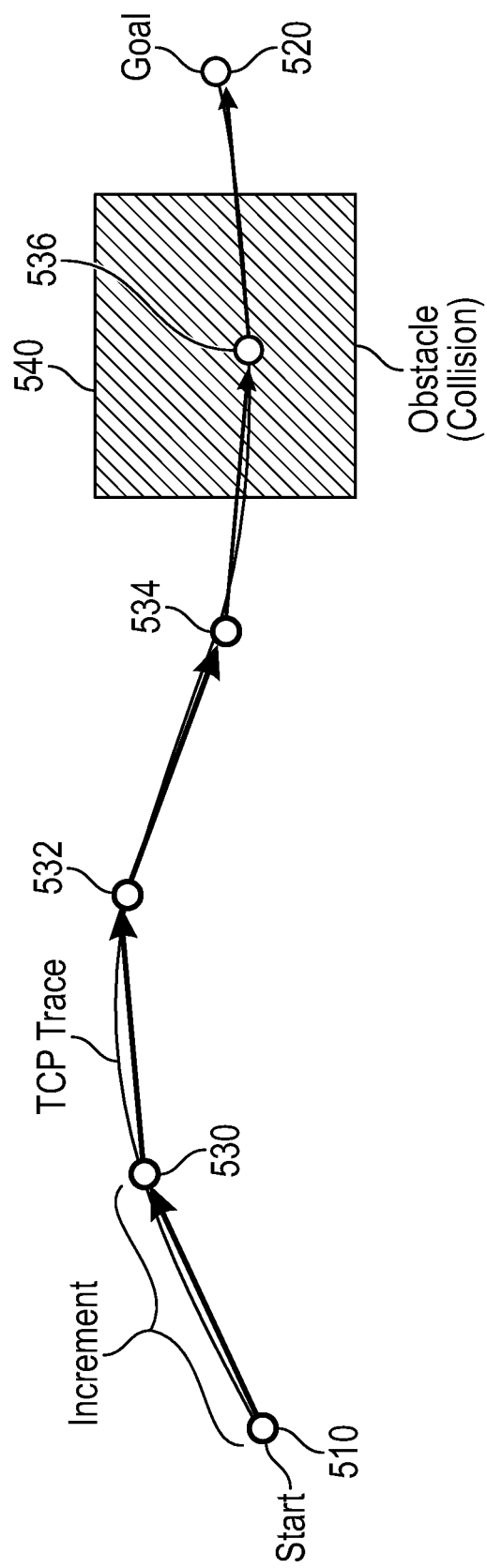
FIG. 5 is a two-dimensional illustration of a move feasibility check technique employed to evaluate each proposed new node in the tree built by the RRT algorithm, including dividing each proposed node step into discrete increments and evaluating multiple criteria at each increment, according to an embodiment of the present disclosure.

FIG. 5 is a two-dimensional illustration of a move feasibility check technique employed to evaluate each proposed new node in the tree built by the RRT algorithm, including dividing each proposed node step into discrete increments and evaluating multiple criteria at each increment, according to an embodiment of the present disclosure. In FIG. 5, a node 510 is a start node in the robot configuration space, and a node 520 is a goal node. The node 510 is typically a feasible branch node that has previously been identified, or may also be the start position 410. The node 520 may be a new proposed node being evaluated by the RRT algorithm, or may be one of the home tree nodes 422 or 424.

When a proposed home move or a new proposed branch node is to be evaluated, many criteria must be checked to determine the feasibility of the move to the new node. As discussed above, collision avoidance is a key criteria, including avoiding contact between any part of any of the robot arms and any of the obstacles or other robots. A tolerance layer may be defined to also prevent near-misses within a certain distance (such as 5 mm) of part-to-part contact. In addition to collision avoidance, safety zones may be defined in the robot workcell which must also be avoided. These safety zones may define a space that an operator may occupy, for example.

Furthermore, many aspects of robot kinematics must be evaluated for each proposed move. First, it must be determined whether the proposed node positions is reachable by the robot. Additionally, several different kinematics and joint configuration criteria are preferably evaluated—including optimally configuring any redundant kinematic axis, evaluating wrist orientation, determining whether robot posture changes are involved in a proposed move, evaluating joint turns and "unwinding" any joints which have rotated more than a full turn, etc. The objective of these advanced robot kinematics considerations and criteria is to find a robot clear recovery path which is smooth and well behaved—that is, does not pass through joint singularity points, does not approach joint motion limits, and does not involve "wrist flips" or sudden posture changes by the robot as the clear recovery path motion is executed.

One approach for evaluating a proposed move from the node 510 to the node 520 would be to run a tool center point move calculation program and check for any errors along the way. However, this approach can have difficulty evaluating all of the aforementioned collision avoidance and robot kinematics considerations throughout the continuous motion, and as a result the move calculation program may take a long time to run. An alternate approach used in the presently disclosed method is to divide the proposed move into a sequence of discrete increments, and evaluate the robot criteria at each of the increments rather than in a continuous path along the way.

A proposed home move or a new proposed branch node may be divided into discrete increments using either joint space interpolation or linear interpolation. FIG. 5 illustrates the proposed move divided into increments using joint space interpolation—where the joint motions required to move from the node 510 to the node 520 are equally divided into five increments, and the resulting tool center point motion follows a curved path in space rather than a straight line in space. Alternately, a linear interpolation could be used—where tool center point motion follows a straight line in space through all five increments. The number of increments used in evaluating each proposed move, and whether joint space interpolation or linear interpolation is used, are matters of design choice.

In the example of FIG. 5, the proposed move from the node 510 to the node 520 is divided into five increments, with incremental positions 530, 532, 534 and 536. In this example an obstacle 540 is the only obstacle between the node 510 and the node 520. Again in FIG. 5, a 2D illustration is used to improve clarity, but it is to be understood that all joint calculations and interference checks are performed using full 3D geometry of the robot and the obstacles.

To evaluate the feasibility of the proposed move from the node 510 to the node 520, the incremental position 530 is first evaluated. This is done by "snapping" the robot to the position 530 (moving the robot to the position in the simulation system) and evaluating all of the collision avoidance and robot kinematics considerations at this discrete position. If no interferences are identified at the position 530, and if all robot kinematics are well behaved (no singularities reached, same robot posture and no joint flips between the node 510 and the position 530, etc.), then the position 530 is determined to be feasible. The process is then repeated for the positions 532 and 534, which are both found to be feasible in this example.

When the position 536 is evaluated, it is determined to be infeasible due to a collision with the obstacle 540. This could be a collision of the robot end-of-arm tool with the obstacle 540, or a collision of some part of one of the robot arms as the robot flexes. Because the position 536 is infeasible, the proposed move from the node 510 to the node 520 is infeasible. However, rather than discard the proposed move from the node 510 to the node 520 entirely, in one embodiment of the disclosed method, the feasible incremental position closest to the goal node 520 is identified as a new feasible branch node. In the example of FIG. 5, the new feasible branch node is the position 534. If all of the positions 530-536 had been found to be feasible, along with the goal node 520 itself, then the goal node 520 would be identified as a new feasible branch node.

The move feasibility check technique described above improves the robustness of the clear recovery path computation by enabling many collision avoidance and robot kinematics considerations to be evaluated, while performing the calculations in a manner which is efficient enough to be performed thousands of times as needed when embedded in the RRT algorithm.

Figure 6:
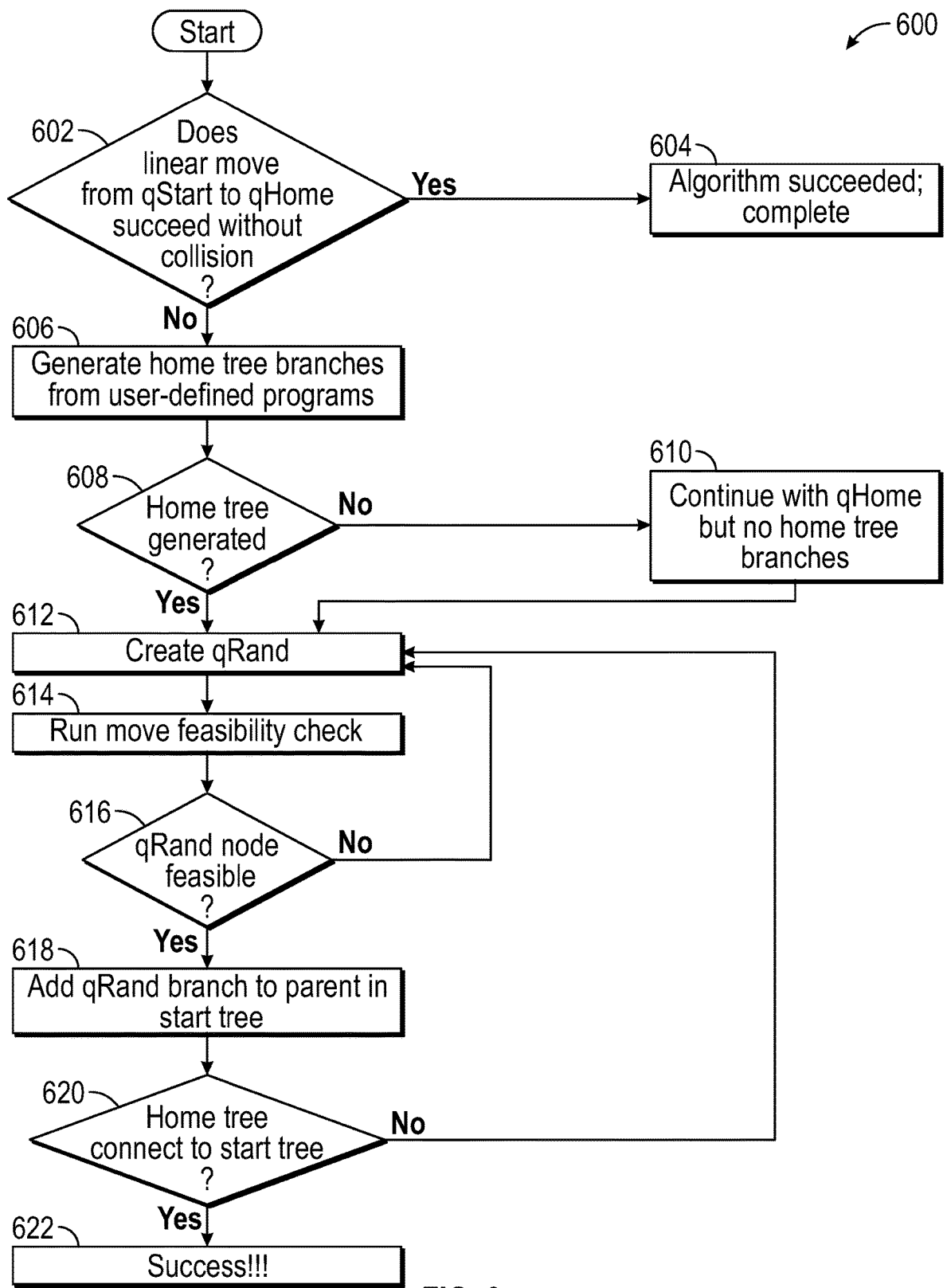
FIG. 6 is a flowchart diagram of a method for executing a clear recovery path search using the specialized RRT algorithm depicted in FIG. 4 and the move feasibility check technique of FIG. 5, according to an embodiment of the present disclosure.

FIG. 6 is a flowchart diagram 600 of a method for executing a clear recovery path search using the specialized RRT algorithm depicted in FIG. 4 and the move feasibility check technique of FIG. 5, according to an embodiment of the present disclosure. After starting, at decision diamond 602, the method determines whether a straight line move from the start position 410 (qStart) to the recovery position 420 (qHome) is possible without collision. If yes, then at box 604 the clear recovery path has been identified and the process is completed. Throughout this discussion, "q" is used to designate a robot configuration including tool center point Cartesian coordinates and a set of robot posture designators (wrist flipped or not-flipped; elbow up or elbow down; wrist turn number; etc.). A complete robot pose—including the positions of all joints, and therefore the 3D positions and geometry of all robot arms—can be computed from "q" using inverse kinematics, as would be understood by one skilled in the art.

If the straight line move from the start position 410 to the recovery position 420 is not possible without collision, then the process moves from the decision diamond 602 to box 606, where home tree branches are constructed, if possible, from the user-defined home tree motion programs described earlier. At decision diamond 608, if none of the user-defined home tree motion programs can be run successfully, then at box 610 the method continues with the recovery position 420 defined as qHome but no home tree branches. Again, in order for a home tree branch to be added, the home tree motion program is simulated and must be determined to be free of collisions and the posture of the robot after the home tree motion program must match the posture of the robot at the start position 410.

At box 612, whether home tree branches have been added or not, a proposed new node qRand is defined by the algorithm. The proposed new node qRand may be a randomly located node according to the RRT algorithm, or may be qHome or a node on a home tree branch. Connecting directly to qHome or a node on a home tree branch may be tried occasionally, at random, in the method. At box 614, the move feasibility check technique of FIG. 5 is executed, to determine if the node qRand can be added as a new branch from its parent (previously identified feasible node). At decision diamond 616, if the move to qRand is feasible, or if a partial move toward qRand is feasible as discussed above, then at box 618 the qRand node and branch are added to the parent in the start tree (the part of the tree that is growing). If no part of the move to qRand is feasible, then from the decision diamond 616 the process loops back to the box 612 to create another proposed new node qRand.

From the box 618, after the qRand node and branch are added to the parent in the start tree, it is determined at decision diamond 620 whether the home tree is connected to the start tree. If so, then at box 622 the clear recovery path has been fully defined and the process is completed. If not, then the process loops back to the box 612 to create another proposed new node qRand. This process continues, growing the start tree until it is connected to the home tree or the qHome node.

Figure 7:
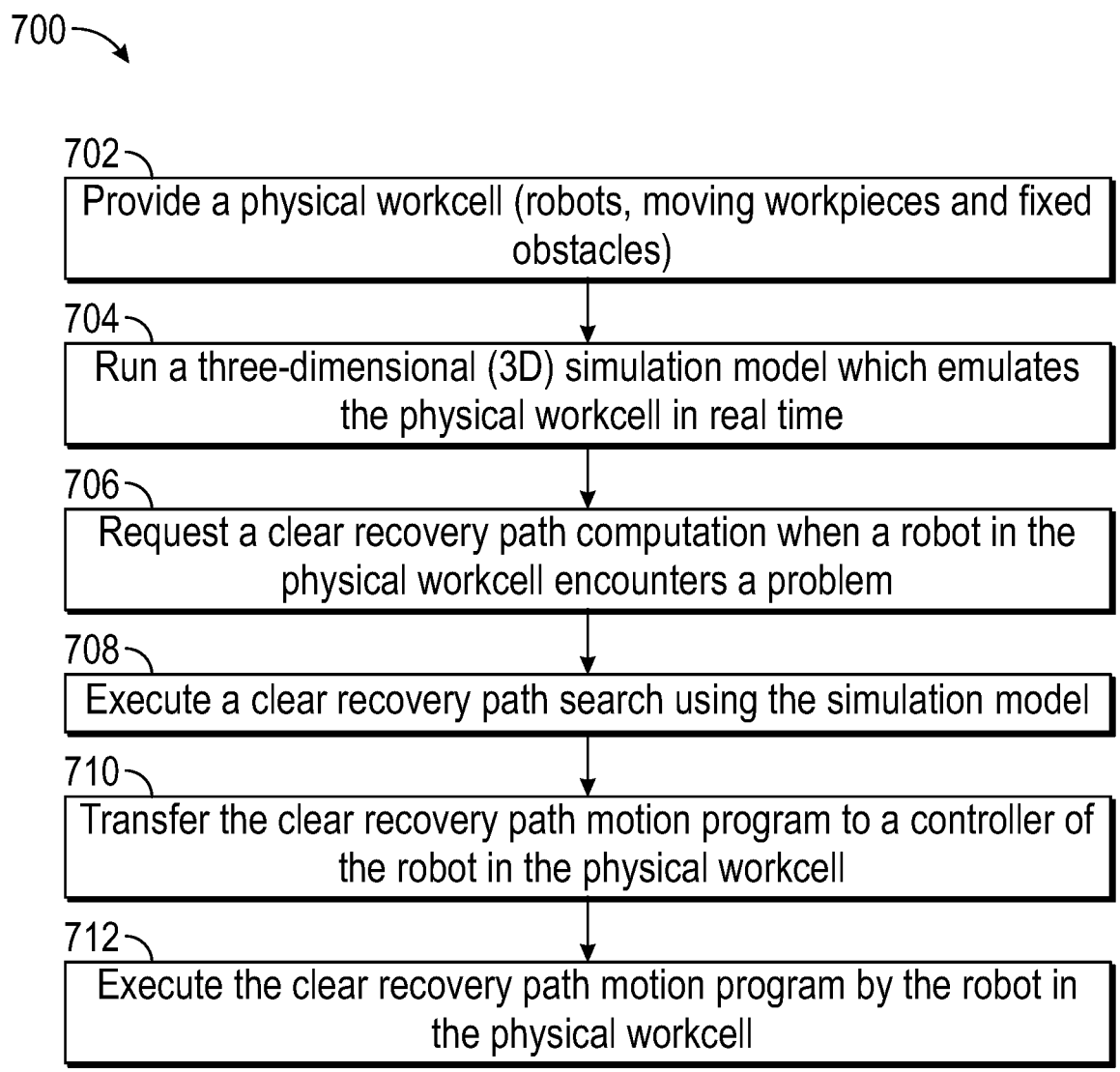
FIG. 7 is a flowchart diagram of a method for robot clear recovery path computation using a virtual simulation environment mirroring a physical robot workcell environment, according to an embodiment of the present disclosure.

FIG. 7 is a flowchart diagram 700 of a method for robot clear recovery path computation using a virtual simulation environment mirroring a physical robot workcell environment, according to an embodiment of the present disclosure. At box 702, a physical workcell is provided, including one or more industrial robots each with a controller, a plurality of fixed or moving workpieces and fixed obstacles. At box 704, a three-dimensional (3D) simulation model which emulates the physical workcell in real time is run, on a computer having a processor and memory. The simulation model includes kinematics and 3D link geometry for the one or more robots, 3D geometry and position of the workpieces and 3D geometry of the obstacles.

At box 706, a clear recovery path computation is requested from the simulation model when an affected robot in the physical workcell encounters a problem. At the time of the request, which is typically made by an operator of the physical workcell, data is transferred from the physical workcell to the simulation model, including transferring position and status data about the one or more robots and the workpieces. The data transferred from the physical workcell provides the simulation model with a complete picture of the 3D positions of the robot(s) and the workpieces, which is needed in order to commence the search for a clear recovery path.

At box 708, a clear recovery path search is executed by the computer running the simulation model, where the path search generates a clear recovery path motion program between a current position of the affected robot and a recovery position of the affected robot. Details of the clear recovery path search method were shown on FIG. 6 and discussed above. When the clear recovery path is identified, a clear recovery path motion program is created which defines the robot joint motions needed to cause the robot to follow the computed clear recovery path.

At box 710, the clear recovery path motion program is transferred to the controller of the affected robot in the physical workcell, and at box 712 the clear recovery path motion program is executed by the affected robot in the physical workcell, which extricates the robot from the situation in which it was "stuck" and returns the robot to its home or recovery position. At that point, appropriate actions can be taken to return the workcell to production operations—where these actions may include restarting the workcell controller, troubleshooting individual robots or the conveyor, replacing components, etc.

Throughout the preceding discussion, various computers and controllers are described and implied. It is to be understood that the software applications and modules of these computer and controllers are executed on one or more computing devices having a processor and a memory module. In particular, this includes a processor in each of the robot controller 330, the PLC 340 and the computers 350 and 362 of FIG. 3 discussed above. Specifically, the processor in the computers 350 and/or 362 is configured to compute the robot clear recovery path in the manner described throughout the foregoing disclosure.

As outlined above, the disclosed techniques for computing a clear recovery path for a robot provide a robust and efficient means of extricating a robot from an arbitrary condition where it is stranded in a workcell. The disclosed techniques avoid the need for up-front modeling of recovery paths for every possible scenario of robot and workpiece positions, and provide many improvements and enhancements over known RRT path finding methods.

While a number of exemplary aspects and embodiments of the technique for automatically finding a collision-free feasible return-to-home path for a robot have been discussed above, those of skill in the art will recognize modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method for planning a recovery path for an industrial robot, said method comprising:
    running, on a computer having a processor and memory, a three-dimensional (3D) simulation model which emulates a physical workcell in real time, where the simulation model includes kinematics and 3D arm geometry for one or more robots in the workcell, 3D geometry and position of fixed or moving workpieces and 3D geometry of obstacles in the workcell;
    executing a clear recovery path search using the simulation model, when a robot recovery is requested for the physical workcell, where the path search computes a recovery path between a current position of an affected robot and a recovery position of the affected robot, the recovery path being collision-free and meeting predefined robot kinematics criteria, and where executing the clear recovery path search includes defining one or more home tree branches from the recovery position to another position in an operating space of the affected robot and using the home tree branches in computing the recovery path, and the home tree branches are defined in advance based on user-predefined motion programs;

transferring a motion program for the recovery path to a controller of the affected robot in the physical workcell; and executing the motion program by the affected robot in the physical workcell.

2. The method according to claim 1 wherein the 3D arm geometry for the one or more robots, 3D geometry and position of the workpieces and 3D geometry of the obstacles is provided as solid or surface models from a computer aided design (CAD) system.

3. The method according to claim 1 wherein executing the clear recovery path search includes transferring physical workcell status data to the simulation model, where the physical workcell status data includes joint positions for the one or more robots, job queue data and positions of the workpieces.

4. The method according to claim 1 wherein the predefined robot kinematics criteria include ensuring that during the recovery path, the affected robot does not pass through joint singularity points, does not approach joint motion limits, and does not experience wrist flips or posture changes.

5. The method according to claim 1 wherein determining that the recovery path is collision-free includes checking for interference between all arms of the affected robot and the workpieces, the obstacles and any other robots.

6. The method according to claim 1 wherein the recovery position of the affected robot is a robot home position or other statically defined recovery position.

7. The method according to claim 1 wherein the home tree branches are only used in computing the recovery path if collision free and kinematically feasible.

8. The method according to claim 1 wherein executing the clear recovery path search includes determining if a straight line path from the current position of the affected robot to the recovery position of the affected robot is collision-free and meets the predefined robot kinematics criteria.

9. The method according to claim 1 wherein executing the clear recovery path search includes building a start tree, beginning from the current position of the affected robot, repeatedly defining a random position of a proposed new node and determining whether a robot move from a parent node to the proposed new node is collision-free and meets the predefined robot kinematics criteria.

10. The method according to claim 9 wherein determining whether a robot move from a parent node to the proposed new node is collision-free and meets the predefined robot kinematics criteria includes dividing the robot move into a set of discrete incremental positions and determining if the affected robot is collision-free and meets the predefined robot kinematics criteria at each of the incremental positions.

11. The method according to claim 10 wherein dividing the robot move into a set of discrete incremental positions includes using either joint space interpolation or linear tool center point interpolation.

12. A method for computing a recovery path for an industrial robot, said method comprising:

defining a start position and a recovery position of an affected robot in a robot configuration space, and defining three dimensional (3D) geometry of one or more obstacles in the configuration space, including fixed objects and fixed or movable workpieces;

using a rapidly-exploring random tree (RRT) algorithm to build a path from the start position to the recovery position, including randomly checking feasibility of a straight line move from a current node to the recovery position, where each proposed move in the RRT algorithm is divided into incremental positions which are evaluated for feasibility and are added to the path only if the incremental positions are collision-free and meet predefined robot kinematics criteria, and where one or more home tree branches are constructed in advance connecting to the recovery position, where the home tree branches are constructed based on user-predefined motion programs and are used to build the path from the start position to the recovery position.

13. A recovery path planning system for industrial robots, said system comprising:

a computer in communication with a physical workcell, said computer having a processor and memory configured to run a three-dimensional (3D) simulation model which emulates the physical workcell in real time, where the simulation model includes kinematics and 3D arm geometry for one or more robots in the workcell, 3D geometry and position of workpieces and 3D geometry of obstacles in the workcell;

where the simulation model executes a clear recovery path search, when a robot recovery is requested for the physical workcell, where the path search computes a recovery path between a current position of an affected robot and a recovery position of the affected robot, the recovery path being collision-free and meeting predefined robot kinematics criteria, and where executing the clear recovery path search includes defining one or more home tree branches from the recovery position to another position in an operating space of the affected robot and using the home tree branches in computing the recovery path, and the home tree branches are defined in advance based on user-predefined motion programs;

and the simulation model transfers a motion program for the recovery path to a controller of the affected robot in the physical workcell, where the recovery path is executed by the affected robot.

14. The system according to claim 13 wherein executing the clear recovery path search includes transferring physical workcell status data to the simulation model, where the physical workcell status data includes joint positions for the one or more robots, job queue data and positions of the workpieces.

15. The system according to claim 13 wherein the predefined robot kinematics criteria include ensuring that during the recovery path, the affected robot does not pass through joint singularity points, does not approach joint motion limits, and does not experience wrist flips or posture changes.

16. The system according to claim 13 wherein determining that the recovery path is collision-free includes checking for interference between all arms of the affected robot and the workpieces, the obstacles and any other robots.

17. The system according to claim 13 wherein the home tree branches are only used in computing the recovery path if collision free and kinematically feasible.

18. The system according to claim 13 wherein executing the clear recovery path search includes determining if a straight line path from the current position of the affected robot to the recovery position of the affected robot is collision-free and meets the predefined robot kinematics criteria.

19. The system according to claim 13 wherein executing the clear recovery path search includes building a start tree, beginning from the current position of the affected robot, including repeatedly defining a random position of a proposed new node and determining whether a robot move from a parent node to the proposed new node is collision-free and meets the predefined robot kinematics criteria.

20. The system according to claim 19 wherein determining whether a robot move from a parent node to the proposed new node is collision-free and meets the predefined robot kinematics criteria includes dividing the robot move into a set of discrete incremental positions and determining if the affected robot is collision-free and meets the predefined robot kinematics criteria at each of the incremental positions.

* * * * *